(12) United States Patent
Schmid et al.

(10) Patent No.: US 7,051,527 B2
(45) Date of Patent: May 30, 2006

(54) INTERNAL COMBUSTION ENGINE HAVING AN EXHAUST-GAS TURBOCHARGER

(75) Inventors: Wolfram Schmid, Nürtingen (DE); Alfred Küspert, Ostfildern (DE); Rolf Hutmacher, Remshalden (DE); Siegfried Sumser, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 54 days.

(21) Appl. No.: 10/772,231

(22) Filed: Jan. 29, 2004

(65) Prior Publication Data

US 2005/0144945 A1 Jul. 7, 2005

(30) Foreign Application Priority Data

Jan. 31, 2003 (DE) .................................. 103 03 777

(51) Int. Cl.
*F02D 23/00* (2006.01)
*F02B 37/18* (2006.01)
*F16K 11/076* (2006.01)

(52) U.S. Cl. ..................................... 60/602; 137/625.47
(58) Field of Classification Search .................. 60/602, 60/605.2; 137/625.47

See application file for complete search history.

(56) References Cited

U.S. PATENT DOCUMENTS

| | | | | |
|---|---|---|---|---|
| 3,721,265 A | * | 3/1973 | Hoffland | 137/625.47 |
| 5,771,928 A | * | 6/1998 | Zepic et al. | 137/625.47 |
| 5,893,392 A | * | 4/1999 | Spies et al. | 137/625.47 |
| 5,943,864 A | * | 8/1999 | Sumser et al. | 60/602 |
| 6,216,459 B1 | * | 4/2001 | Daudel et al. | 60/602 |
| 6,223,534 B1 | * | 5/2001 | Erdmann et al. | 60/602 |

FOREIGN PATENT DOCUMENTS

| | | |
|---|---|---|
| DE | 196 18 160 C 2 | 11/1997 |
| DE | 197 05 422 C 1 | 9/1998 |
| DE | 198 25 920 A 1 | 12/1999 |
| DE | 198 43 026 C 2 | 3/2000 |
| DE | 198 54 234 | 6/2000 |
| DE | 101 32 672 A 1 | 1/2003 |
| DE | 10222919 A1 * | 12/2003 |
| WO | WO 2004053310 A1 * | 6/2004 |
| WO | WO 2005001257 A1 * | 1/2005 |

* cited by examiner

*Primary Examiner*—Thai-Ba Trieu
(74) *Attorney, Agent, or Firm*—Klaus J. Bach

(57) ABSTRACT

In an internal combustion engine having an exhaust system with a turbocharger including an exhaust gas turbine disposed in the engine exhaust duct, a bypass line connected to the exhaust duct upstream of the turbine including a valve for diverting exhaust gas flow and bypassing the turbine, the valve includes a valve body having first and second exhaust gas flow control openings of different flow cross-sections and being adjustable between a first position in which the first flow control openings is in communication with the exhaust gas duct, a second position in which the second flow control opening is in communication with the exhaust gas duct and a blocking position in which exhaust gas bypass flow through the valve is blocked.

6 Claims, 2 Drawing Sheets

INTERNAL COMBUSTION ENGINE HAVING AN EXHAUST-GAS TURBOCHARGER

BACKGROUND OF THE INVENTION

The invention relates to an internal combustion engine having an exhaust-gas turbocharger with an exhaust turbine and a valve arranged in the exhaust gas duct upstream of the turbine of the turbocharger for releasing exhaust gas from the exhaust gas duct.

The document DE 198 57 234 A1 describes a turbocharged internal combustion engine whose exhaust-gas turbine is equipped with variable turbine inlet guide vanes for controlling the effective inlet flow cross-section of the turbine. The turbine guide vane structure can be inserted axially into the inlet flow passages of the turbine and is used, in particular in the engine braking mode, to reduce the inlet flow cross section of the turbine. As a result, the exhaust-gas back pressure is increased and the pistons in the cylinders of the internal combustion engine have to perform exhaust work against the increased exhaust gas pressure. As a result, the engine braking performance can be considerably increased. In the engine operating mode, in contrast, the guide vane structure is under full load fully withdrawn from the inlet flow passages of the turbine, in order to provide for maximum exhaust-gas mass flow through the turbine.

In order to avoid impermissibly high loading of components both at maximum power operation of the engine and in the engine braking mode and to achieve controlled operation, for example in order to implement a cruise control function, a bypass which bridges the turbine and has an adjustable bypass valve is provided, the bypass branching off from the exhaust pipe upstream of the turbine and extending to the exhaust-gas duct downstream of the turbine. Since considerably higher exhaust-gas back pressures occur in the engine braking mode than in the driving mode, mass flows of the exhaust gas via the bypass of differing magnitude are diverted with the same opening state of the bypass valve. This has to be taken into consideration by different control strategies for release of exhaust gas via the bypass.

It is the object of the invention to provide a charged internal combustion engine wherein the exhaust-gas mass flow, which is to be released so as to bypass the exhaust-gas turbine, is controlled by simple measures, both in the engine braking mode and in the engine driving mode.

SUMMARY OF THE INVENTION

In an internal combustion engine having an exhaust system with a turbocharger including an exhaust gas turbine disposed in the engine exhaust duct, a bypass line connected to the exhaust duct upstream of the turbine including a valve for diverting exhaust gas flow and bypassing the turbine, the valve includes a valve body having first and second exhaust gas flow control openings of different flow cross-sections and being adjustable between a first position in which the first flow control openings is in communication with the exhaust gas duct, a second position in which the second flow control opening is in communication with the exhaust gas duct and a blocking position in which exhaust gas bypass flow through the valve is blocked.

With the internal combustion engine according to the invention which is equipped with an exhaust gas bypass around the exhaust-gas turbine, the exhaust-gas mass flow through the bypass can be controlled by a valve device, whose valve body has two separate communication openings of different configuration, so that it is possible to control exhaust-gas mass flows of differing magnitude which are to be released via the bypass. The communication openings in the valve body each represent a particular open position of the valve device, and one of the communication openings is moved into alignment with a release opening of the exhaust pipe. Given an identical exhaust-gas back pressure, exhaust-gas mass flows through the bypass of differing magnitude are established in the various open positions of the communication openings. If, in contrast, no exhaust gas is to be released, it is possible to move the valve body to a closed position.

With two different open positions each open position of the valve device can be used for different operating states of the internal combustion engine. It is thus, in particular, possible to use a first open position with the engine in a driving mode and the second open position to the engine in a braking mode. As there is an increased exhaust-gas back pressure in the exhaust-gas duct section upstream of the exhaust-gas turbine in the engine braking mode if the exhaust-gas turbine is equipped with a variable guide vane structure for variable settings of the effective entry flow cross-section of the turbine and the turbine guide vanes are in the blocking position so that the upstream exhaust gas is compressed, a higher exhaust-gas mass flow is potentially released when the valve is opened than in the normal engine driving mode, in which the turbine guide vanes are in the open position and in which accordingly a lower exhaust-gas back pressure is present. This potentially higher exhaust-gas mass flow to be released in the engine braking mode can be controlled in a better and more precise way by the relevant communication opening, which in the open position of the valve device assigned to the engine braking mode, permits a smaller exhaust-gas mass flow with comparable adjustment movement of the valve body than the communication opening which, in the second open position, is assigned to the engine driving mode. This differing release behaviour via the two communication openings is achieved, for example, by cross-sectional areas of different size and/or different cross-sectional shapes of the communication openings. Here, the communication opening provided when the engine is in braking mode advantageously has a smaller cross-sectional area than the communication opening provided when the engine is in the driving mode.

But even if the cross-sectional areas are the same, relief mass flows of different magnitude can be provided as a function of the adjustment travel distance, if the communication openings have different cross-sectional shapes. As a result, congruences of differing size between the relevant communication opening and the release opening of the exhaust pipe can be provided with identical adjustment travel distances. Optionally, the different cross-sectional shapes are also combined with cross-sectional areas of different sizes.

The valve body is configured, in particular, as a hollow-cylindrical rotary slide member which can be rotated about its longitudinal axis. In this embodiment, the two communication openings are arranged at different angular positions and provide for communication from the outside of the hollow body to the inside of the hollow body, to which the bypass line is connected.

In an alternative embodiment, the hollow body can also be displaced in a translational manner in the direction of its longitudinal axis; in this embodiment, the communication openings are situated at different axial positions on the valve body.

According to a further embodiment, valve bodies which are not configured as hollow bodies are also suitable. Here, they may be simple slides which are displaced by translation or rotation and are incorporated in the form of two communication openings of different shape and/or different size.

According to a another expedient embodiment, the exhaust-gas collection space in the exhaust-gas turbine which is upstream of the turbine wheel has two separate exhaust-gas manifolds which are each in communication with an exhaust pipe of the engine, the two exhaust-gas pipes expediently having different sizes. An exhaust gas recirculation line of an exhaust-gas recirculation system branches off from the smaller exhaust-gas pipes. A higher exhaust-gas back pressure can be set in this exhaust pipe because of the smaller dimensions of this exhaust-gas manifold, so that it is possible to perform exhaust-gas recirculation within a wide operating range of the internal combustion engine. In this refinement, the release openings of the two exhaust pipes of the manifolds are dimensioned in such a way that the two exhaust-gas flows through the release openings to the bypass are approximately of the same magnitude.

The invention will become more readily apparent from the following description of the invention on the basis of the accompanying drawings:

DESCRIPTION OF A PREFERRED EMBODIMENT

Figure 1:
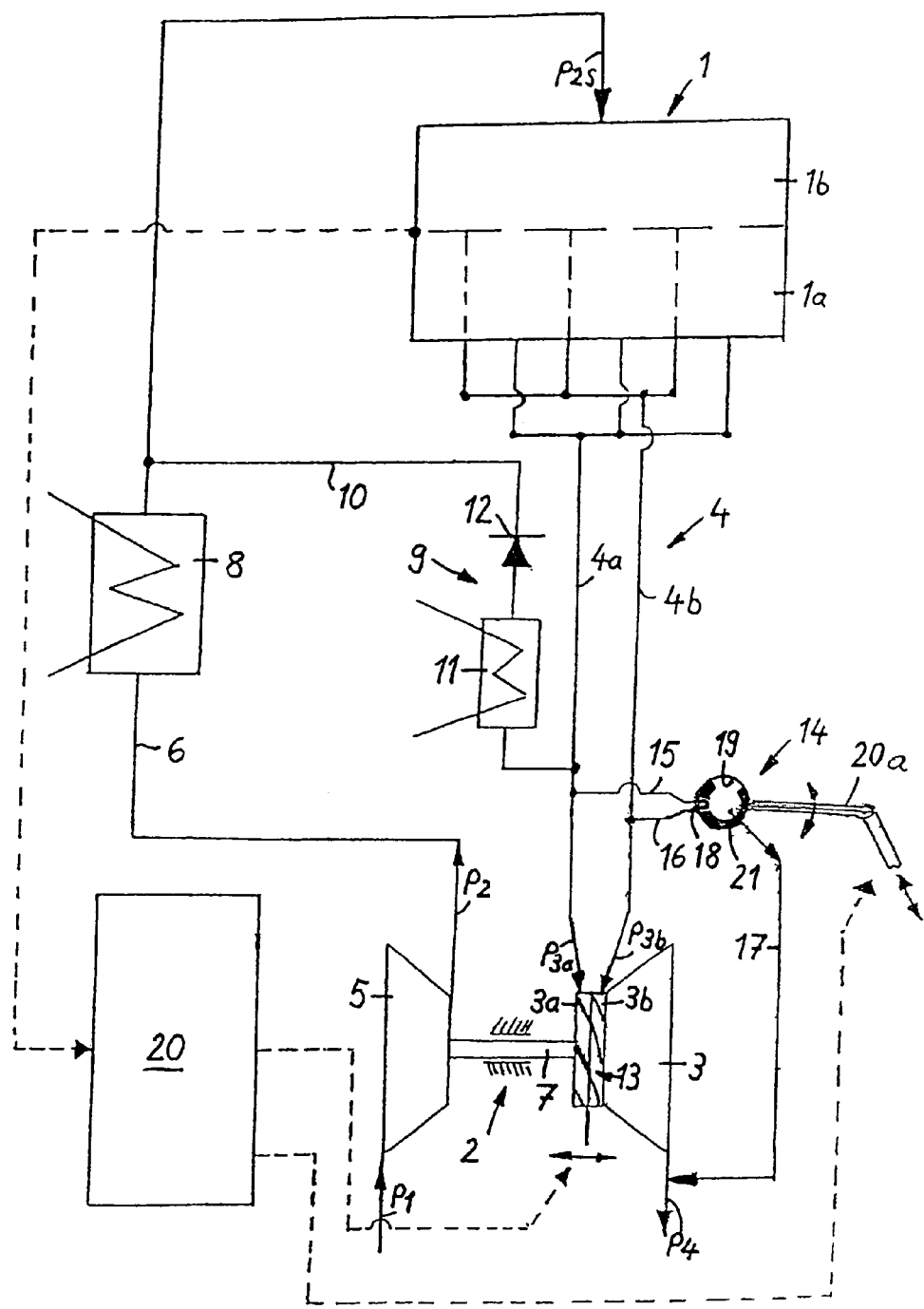
FIG. 1 is a schematic representation of a charged internal combustion engine having an exhaust-gas turbine with two exhaust-gas inlet passages which are each supplied with exhaust gas via an exhaust pipe, each exhaust pipe being connected to a manifold of a bank of cylinders of an internal combustion engine, and having a valve device, by means of which exhaust gas can be released via a bypass which bridges the exhaust-gas turbine.

The internal combustion engine 1 shown in FIG. 1 is a spark-ignition engine or a diesel engine having two banks of cylinders 1a and 1b, from which the exhaust gas is discharged via exhaust pipes 4a and 4b of an exhaust-gas system 4. The internal combustion engine 1 includes an exhaust-gas turbocharger 2, which comprises an exhaust-gas turbine 3 in the exhaust-gas system 4 and a compressor 5 in the intake section 6, the compressor 5 being driven by the exhaust-gas turbine 3 via a shaft 7. During operation of the internal combustion engine, air at the atmospheric pressure $p_1$ is drawn in by the compressor 5 and compressed to an increased pressure $p_2$, at which pressure the combustion air is fed to a charge air cooler 8. After being cooled in the charge air cooler 8, the charge air is supplied with the charge air pressure $P_{2S}$ to the cylinders of the internal combustion engine 1. The exhaust gases which are to be fed to the exhaust-gas turbine 3 via the two exhaust pipes 4a and 4b are upstream of the exhaust-gas turbine at the exhaust-gas back pressure $p_{3a}$ and $p_{3b}$, respectively. After it is expanded in the exhaust-gas turbine 3, the exhaust gas is discharged at the expanded pressure $p_4$.

The internal combustion engine 1 is equipped with an exhaust-gas recirculation device 9, via which it is possible to transfer exhaust gases from the exhaust-gas section 4 into the intake section 6 downstream of the charge-air cooler 8. The exhaust-gas recirculation device 9 comprises a recirculation line 10 which branches off from the first exhaust pipe 4a and extends to the fresh air supply duct 6. An exhaust-gas cooler 11 and a downstream one-way or shut-off valve 12 are arranged in the exhaust gas recirculation line 10. The one-way valve 12 prevents exhaust gas from flowing back into the exhaust pipe and is expediently configured as a passive component. It may, however, also be expedient to configure the shut-off valve 12 to be adjustable, so that the latter can be opened and closed as a function of operating variables of the internal combustion engine.

The exhaust-gas turbine 3 is equipped with a variable vane structure 13, by which the effective entry cross-section of the turbine can be controlled between a minimum flow or blocking position and a maximum flow or open position. It is possible to influence the behavior of the internal combustion engine by adjusting the variable vane structure, both in the engine driving mode and in the engine braking mode.

The exhaust-gas turbine 3 has two inlet passages and comprises an exhaust-gas collection space which is arranged upstream of the turbine wheel, and which is configured, in particular, as a helical passage comprising two exhaust-gas inlets 3a, 3b. Each exhaust-gas inlet 3a, 3b is connected to one of the exhaust pipes 4a and 4b, respectively. The two exhaust-gas inlets 3a and 3b are configured to be of different size. The exhaust-gas inlet 3a which is supplied with exhaust gas via the exhaust pipe 4a and from which the exhaust gas recirculation line 10 of the exhaust-gas recirculation system 9 branches off is expediently smaller than the exhaust-gas inlet 3b which is not involved in exhaust-gas recirculation.

Exhaust gas from one or both exhaust pipes 4a and 4b can be routed to bypass the exhaust-gas turbine via a valve device 14 disposed upstream of the exhaust-gas turbine 3 and a bypass line 17 which bypasses the exhaust-gas turbine. The valve device 14 is coupled to the exhaust pipes 4a and 4b via two connecting lines 15 and 16. The bypass line 17 which extends in the exhaust-gas duct downstream of the exhaust-gas turbine 3 branches off from the valve device 14.

The valve device 14 has a hollow-cylindrical valve body 21 which can be rotated about its longitudinal axis by an actuator 20a between a closed position, in which release of exhaust gas from the exhaust-gas ducts 4 is prevented, and two different open positions. Two communication openings 18 and 19 are incorporated into the valve body and are each assigned to one of the open positions, in which one of the communication openings is flow-connected to one or to both of the connecting lines 15 and 16 and exhaust gas can flow into the interior of the hollow-cylindrical valve body 21 via the respective communication opening, the bypass 17 being in communication with the valve body 21. In the closed position, in contrast, the valve body 21 is rotated to such an extent that the communication openings are displaced from the release openings of the connecting lines 15 and 16 and therefore all communication between the exhaust pipes 4a and 4b and the bypass 17 is blocked.

Moreover, the internal combustion engine 1 includes a control unit 20, via which the adjustable units of the internal combustion engine can be set as a function of state and operating variables. This relates, in particular, to the variable turbine geometry 13 and the valve device 14.

Figure 2:
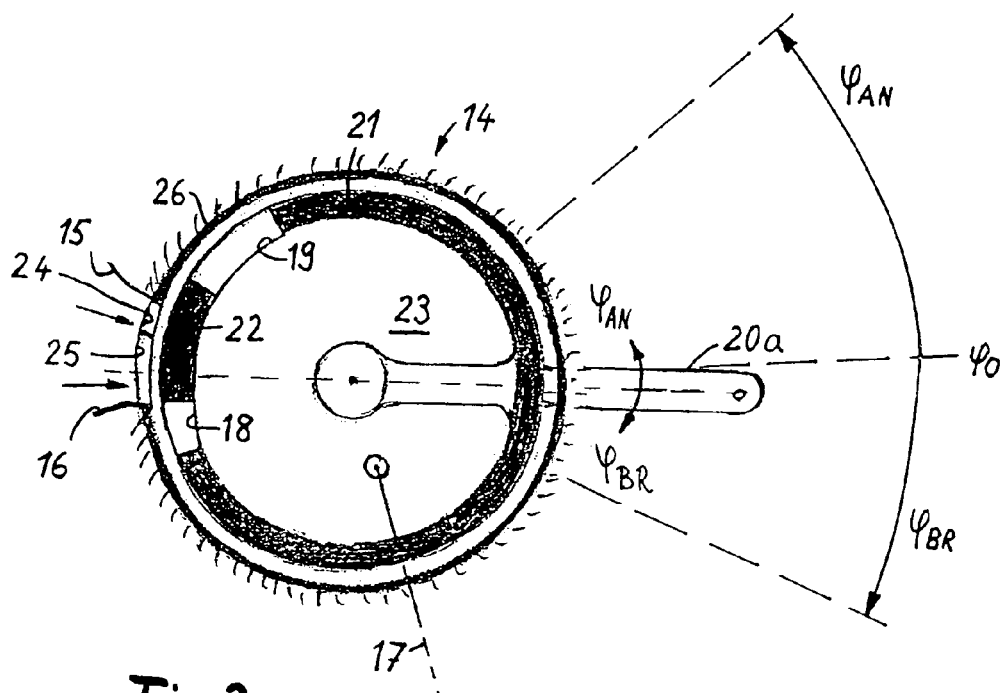
FIG. 2 shows a section through a valve device, by means of which the exhaust-gas mass flow to be released can be controlled.

FIG. 2 shows a section through the valve device 14. The hollow-cylindrical valve body 21 is rotatably mounted in a valve housing 26 and can be adjusted between its open positions and its closed position by the actuator 20*a*. The communication openings 18 and 19 are incorporated into the wall of the valve body 21 and have a cross-sectional area of different size, the first communication opening 18 with the smaller cross-sectional area being assigned to the first open position, which is assumed by the valve device 14 in the engine braking mode, and the second communication opening 19 with the larger cross-sectional area corresponding to the second open position, which is assumed by the valve device 14 in the engine driving mode. The two communication openings 18 and 19 are separated by a wall section 22, which extends between them and is expediently forms the blocking structure in the closed position of the valve device.

Two exhaust gas release openings 24 and 25 are incorporated into the valve housing 26 corresponding to the inlet openings of the connecting lines 15 and 16 which branch off from the two exhaust pipes 4*a* and 4*b* (FIG. 1). The release openings 24 and 25 advantageously have different cross-sectional areas, the first release opening 24, which is assigned to that exhaust pipe, which leads to the exhaust-gas manifold with the smaller cross section, also having a smaller cross-sectional area than the adjacent release opening 25 for the second exhaust pipe or the exhaust-gas inlet passage with the larger cross section. The two release openings 24 and 25 can be configured as separate openings in the valve housing 26. It may, however, be expedient to provide only one common release opening for both connecting lines or exhaust pipes without a separating wall in between.

The larger communication opening 19, which is assigned to the engine driving mode, has approximately the same cross-sectional area as the two release openings 24 and 25 taken together. The wall section 22 between the two communication openings 18 and 19 extends over an angular segment which allows the two release openings 24 and 25 to be completely blocked. This closed position of the valve device 14 is referred to as the central position $\phi_0$, starting from which a rotational movement in accordance with the direction of the arrow $\phi_{BR}$ (see also FIG. 3) rotates the valve body 21 until the first communication opening 18 moves into an overlapping position with the release openings 24 and 25. In contrast, rotation from the central position $\phi_0$ in the opposite direction in accordance with the arrow $\phi_{AN}$ moves the opening 19 to the second open position, which is assigned to the engine driving mode and in which the second communication opening 19 moves into an overlapping position with the release openings 24 and 25.

In each of the two open positions of the valve device 14, exhaust gas can be released via the release openings 24, 25 and the relevant communication opening 18 or 19 radially into the cylindrical interior 23 of the valve body 21 and onward in the axial direction into the bypass line 17 connected to the valve 14.

Figure 3:
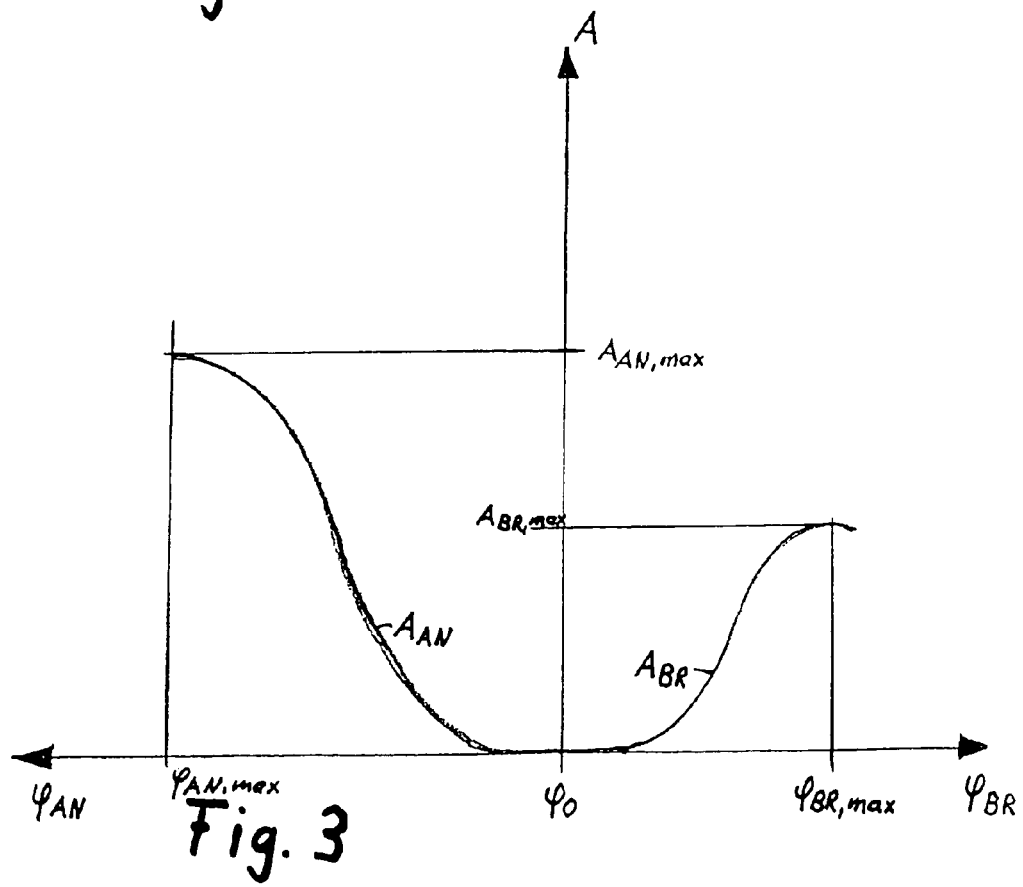
FIG. 3 shows a diagram illustrating the profile of the release cross-section as a function of the adjustment angle of the valve device, shown for two different communication openings in the valve body, of which a first communication opening is assigned to the engine driving mode and the second communication opening is assigned to the engine braking mode.

The diagram according to FIG. 3 shows the release opening cross section A as a function of the adjustment angle $\phi$. The release opening cross section $A_{BR}$ increases during rotation of the valve body, starting from the central position $\phi_0$, in the direction $\phi_{BR}$ from the value 0 to a maximum value $A_{BR,max}$ which is achieved at the angular position $\phi_{BR,max}$. This release cross section is achieved in the first open position and corresponds to the cross-sectional area of the first communication opening 18.

In a corresponding manner, the release cross section $A_{AN}$ rises during rotation of the valve body in the opposite direction, starting from the central position $\phi_0$, with an increasing rotational angle $\phi_{AN}$ from the value 0 to the maximum value $A_{AN,max}$ which is achieved at an angular position $\phi_{AN,max}$. This maximum release cross section is assigned to the combustion driving mode and corresponds to the cross-sectional area of the second communication opening 19.

What is claimed is:

1. An internal combustion engine having an exhaust system with an air intake duct (6) and an exhaust duct (4), a turbocharger (2) with an exhaust gas turbine (3) disposed in said exhaust duct (4) so as to be driven by the exhaust gas of the internal combustion engine and a compressor (5) disposed in the air intake duct (6) and connected to said turbine (3) so as to be driven thereby, a rotary slide valve (14) disposed in communication with said exhaust duct (4) up-stream of said exhaust gas turbine (3), and a bypass line (17) connected to said valve (14) and bypassing said turbine (3) for discharging exhaust gas from first and second exhaust ducts 4*a*, 4*b*) upstream of said turbine (3), said valve (14) including a valve housing (26) with relief openings (24, 25) disposed adjacent to each other and with a valve body (21) movably disposed in said valve housing and having first and second exhaust gas flow control openings (18, 19) of different flow cross sections, said valve body (21) being hollow cylindrical so as to define an open interior space (23), and said first and second control openings (18, 19) being formed in the wall of said hollow valve body (21) in spaced relationship with the space therebetween extending over an intermediate angular wall section (22) of said valve body (21) corresponding to the size of both of said release opening (24, 25) for blocking communication with said exhaust duct (4) and said bypass line 17 being in communication with the interior space (23) of said hollow valve body (21), said valve body (21) being movable from a blocking position in which said intermediate angular wall section (22) blocks both said release openings (24, 25) in one direction to a position in which one of said release openings (25) is in communication with the second exhaust gas flow control opening (18) and in the Opposite direction to a position in which both release openings (24, 25) are in communication with the first exhaust gas flow control opening (19).

2. An internal combustion engine according to claim 1, wherein said exhaust gas turbine (3) has two exhaust gas inlet passages (3*a*, 3*b*), which are each connected to a different exhaust pipe (4*a*, 4*b*) of the exhaust gas duct (4), and each exhaust pipe (4*a*, 4*b*) is in communication by a connecting line (15, 16) with the respective release opening (24, 25) in said valve housing for communication selectively with one of the communication openings (18, 19) in the open positions of the valve device (14).

3. An internal combustion engine according to claim 2, wherein the two exhaust gas inlet passages (3*a*, 3*b*) have different flow passage cross-sections.

4. An internal combustion engine according to claim 3, wherein an exhaust gas recirculation device (9), is provided having a recirculation line (10), which branches off from one of the exhaust pipes (4*a*, 4*b*) assigned to the exhaust gas inlet (3*a*) with the smaller one of the different flow passage cross-sections and extends to the intake duct (6) for supplying exhaust gas thereto.

5. An internal combustion engine according to claim 4, wherein the release openings (24, 25) which are assigned to the respective exhaust gas inlets (3*a*, 3*b*) are dimensioned in such a way that about the same mass flow is released from both exhaust pipes (4*a*, 4*b*).

6. An internal combustion engine according to claim 1, wherein said exhaust gas turbine (3) is equipped with a variable vane structure (13) for controlling the effective inlet flow cross-section of the turbine.

* * * * *